J. A. ALVEY.
BEARING FOR CONVEYER ROLLERS.
APPLICATION FILED SEPT. 5, 1916.

1,219,901. Patented Mar. 20, 1917.

Witnesses:
Edgar T. Farmer
A. M. Holcombe

Inventor:
John A. Alvey,
by Carr & Carr
his Attys.

UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI, A CORPORATION OF MISSOURI.

BEARING FOR CONVEYER-ROLLERS.

1,219,901.

Specification of Letters Patent.

Patented Mar. 20, 1917.

Application filed September 5, 1916. Serial No. 118,452.

*To all whom it may concern:*

Be it known that I, JOHN A. ALVEY, a citizen of the United States, and a resident of the city of St. Louis and State of Missouri, have invented a new and useful Improvement in Bearings for Conveyer-Rollers, of which the following is a specification.

My invention relates to bearings for conveyer rollers and particularly to that type used in connection with gravity conveyers.

The principal object of my invention is to provide a bearing for the end of the roller which can be cheaply manufactured and will be strong and durable and simple in construction.

Another object is to simplify the lubrication of the bearing by dispensing with oil cups. A further object is to dispense with the balls and rollers commonly used in most types of bearings for conveyer rollers.

The invention consists in the combinations and arrangements of parts hereinafter described and claimed.

Figure 1:
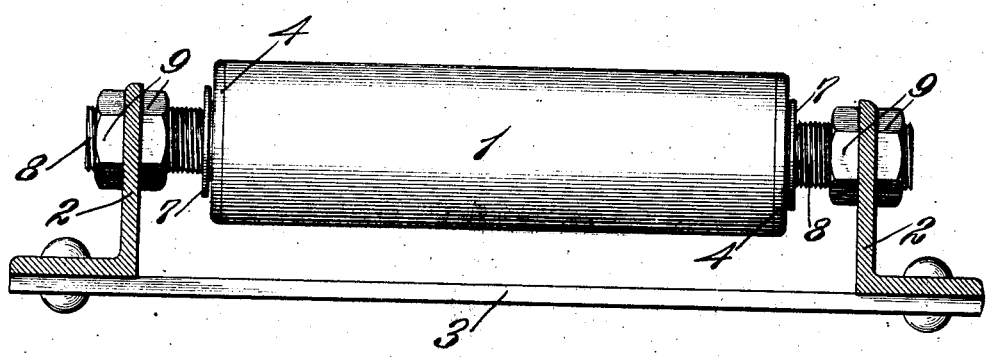
Figure 2:
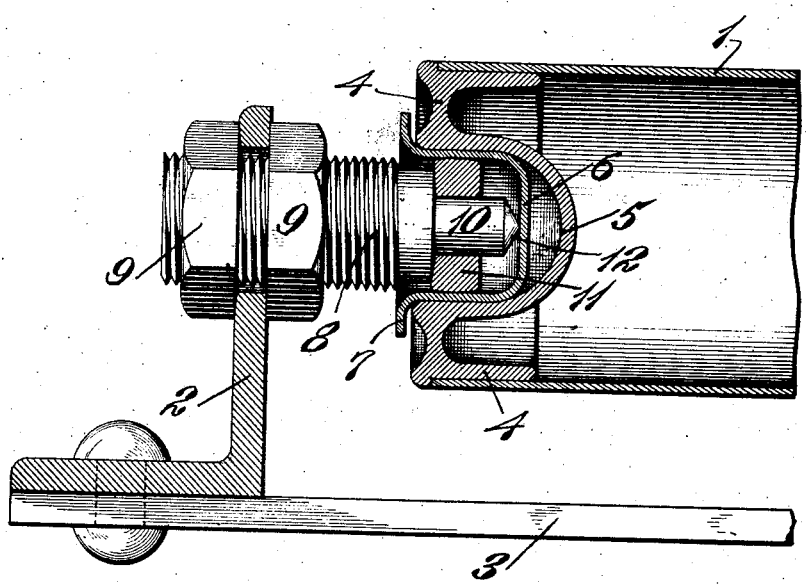

The accompanying drawing, forms part of this specification, wherein like numerals refer to like parts wherever they occur, Figure 1 is a side view of a conveyer roller embodying my invention, the angle iron support being shown in section; and Fig. 2 is a fragmentary vertical longitudinal section showing the bearing at one end of the roller.

In the construction illustrated in the drawing, the bearing is used in connection with an ordinary tubular conveyer roller 1, which is supported at each end by angle iron supports 2, which are connected by tie bars 3. Pressed into each end of the conveyer roller is a cap 4, whose central portion 5 is concave. Pressed into the concave portion 5 of the cap 4, is a hardened steel circular bearing cup 6 having an annular flange 7.

The vertical legs of the angle iron supports 2 are provided with holes at suitable distances apart. Through these holes extend threaded bearing spindles 8 which are held firmly in the desired position by lock nuts 9 screwed on the threaded portion of the bearing spindle on opposite sides of the angle iron support. The inner end portion 10 of the bearing spindle 8 is reduced. Rotatably mounted on this reduced end portion 10 of the bearing spindle 8 is a floating bushing 11, which is mounted in the hardened steel bearing cup 6. The shoulder formed on the spindle by the reduced end portion acts as a stop to limit the outward movement of the bushing.

The reduced end portion 10 of the bearing spindle extends through the floating bushing and is tapered to a point 12. This point 12 engages the bottom of the bearing cup 6. The space between the bushing 11 and the bottom of the bearing cup 6 is filled with oil or grease for lubrication. The end thrust wear of the roller is between the end wall of the hardened steel bearing cup and the tapered point of the bearing spindle and may be taken up by unscrewing the lock nuts and moving the bearing spindle in and again clamping it in the desired position. Should the bearing cup become worn it can easily be removed and a new one inserted. The floating bushing is an annulus or ring whose edge is slightly rounded to form an approximately spherical surface and is frictionally held in the bearing cup 6 so as to rotate with the cup.

The bearing will adjust itself to various conditions, such, for instance, as one angle iron support sitting higher than the other, or the vertical leg of the angle iron becoming bent. Under such conditions, as the bearing spindle is clamped firmly in place on the angle iron support, the reduced end of the spindle bearing will move up or down and this movement will cause the bushing to rock slightly on its outer surface in the bearing cup and thereby adjust itself automatically to the changed conditions, and thereby enable the roller to continue to run smoothly.

What I claim and desire to secure by Letters Patent is:

1. In a bearing for conveyer rollers, a roller arranged between spaced supports, a cap secured to each end of the roller, a bearing cup carried by each cap, a spindle mounted on each support opposite each end of the roller and projecting into the adjacent cup, the ends of said spindles having bearings against the bottoms of the adjacent cups to prevent endwise movement of said roller, and a floating bearing member journaled upon each spindle and movably engaging the wall of said bearing cup to support said roller.

2. In a bearing for conveyer rollers, a roller mounted on spaced supports, a cap for each end of the roller, said cap being provided at its center with a concave portion, a bearing cup removably secured in said concave portion, the walls of said bearing cup frictionally engaging a bushing located in said cup and means for holding said bushing in the bearing cup.

3. In a bearing for conveyer rollers, a roller, a cap pressed into each end of said roller, a bearing cup carried by the cap, a spindle mounted adjacent to each end of the roller, the end of said spindle being pointed and engaging the bottom of the bearing cup.

4. In a bearing for conveyer rollers, a roller, a cap secured to each end of said roller, a bearing cup secured to said cap, a spindle adjustably mounted at each end of the roller, a reduced portion formed on the end of the spindle, a shoulder on said spindle formed by the reduced portion and a bushing having its periphery rounded to form a substantially spherical surface, said bushing being rotatably mounted on the reduced portion of the spindle.

5. In a bearing for conveyer rollers, a roller, caps for the respective ends of said roller, each cap carrying a bearing cup pressed therein, spindles projecting into said cups, each spindle having a bushing mounted thereon and engaging the walls of the bearing cup, said bushing being spaced away from the end wall of the bearing cup and forming therewith a grease pocket.

Signed at St. Louis, Missouri, this 30th day of August, 1916.

JOHN A. ALVEY.